May 12, 1953  A. H. SNYDER  2,638,490
STORAGE BATTERY AND LIFT DEVICE
Filed May 7, 1947  2 Sheets-Sheet 1
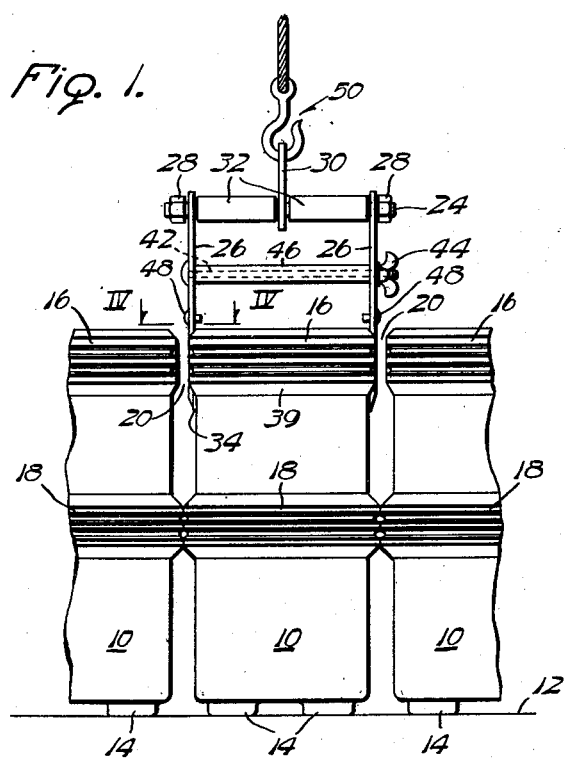
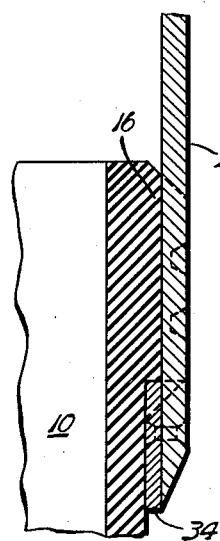
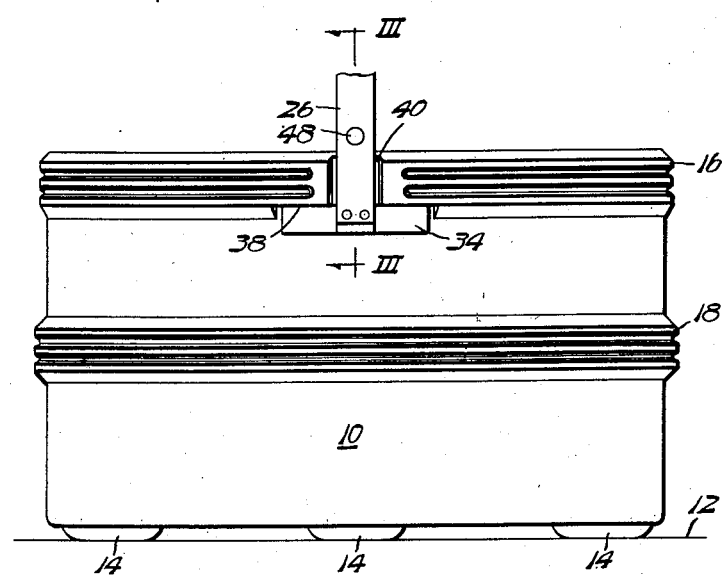
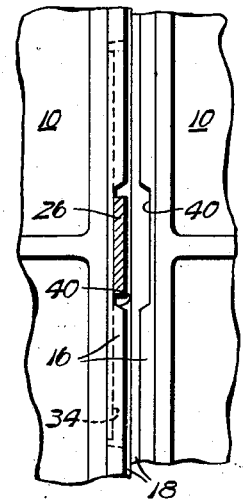
INVENTOR
Almond H. Snyder
BY
Bean, Brooks, Buckley & Bean
ATTORNEYS May 12, 1953     A. H. SNYDER     2,638,490
STORAGE BATTERY AND LIFT DEVICE
Filed May 7, 1947     2 Sheets-Sheet 2
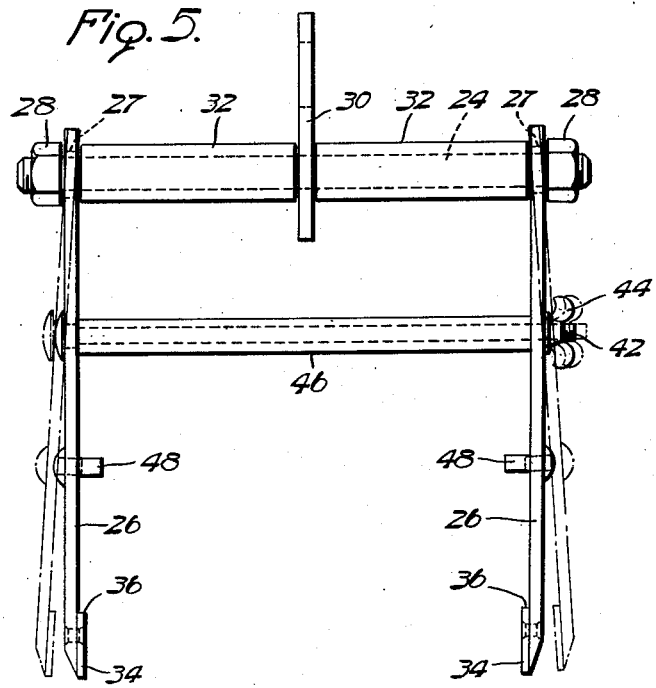
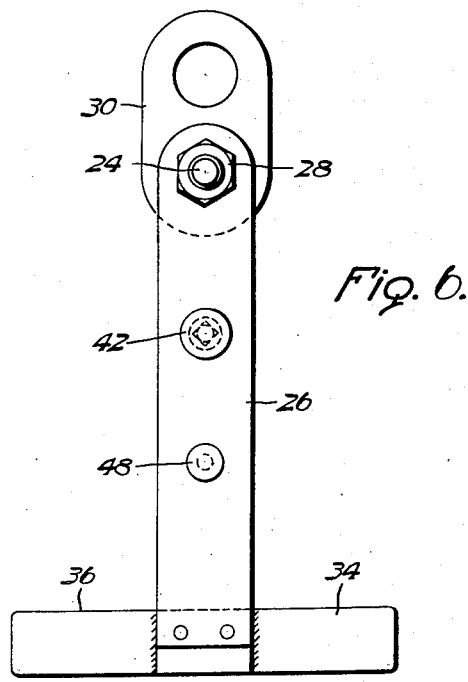
INVENTOR
Almond H. Snyder
BY
Bean, Brooks, Buckley + Bean.
ATTORNEYS Patented May 12, 1953

2,638,490

UNITED STATES PATENT OFFICE 2,638,490

STORAGE BATTERY AND LIFT DEVICE

Almond H. Snyder, Lancaster, N. Y., assignor to National Battery Company, St. Paul, Minn.

Application May 7, 1947, Serial No. 746,558

4 Claims. (Cl. 136—166)

This invention relates to storage batteries, and more particularly to an improved arrangement for grappling storage batteries in connection with lowering and lifting thereof into and out of cramped quarters or closely nested positions; such as in connection with the mounting of such batteries in "banks" or rows under conditions such as make space-saving of utmost importance.

One of the objects of the invention is to provide an improved method and means for selectively grappling storage batteries in connection with the lowering and raising thereof into and out of relatively nested positions.

Another object of the invention is to provide an improved tool for grappling storage batteries for the purposes aforesaid.

Another object of the invention is to provide an improved storage battery case construction, whereby grappling thereof is facilitated.

Other objects and advantages of the invention will appear in the specification hereinafter.

In the drawings:

Fig. 1 is a view showing fragmentarily in end elevation a plurality of storage battery cases standing in closely nested relation, with a grappling means of the invention in operative connection upon one of the batteries;

Fig. 2 is a side elevation of a battery, showing a portion of the grappling tool in position thereof;

Fig. 3 is a fragmentary sectional view, on an enlarged scale, taken along line III—III of Fig. 2;

Fig. 4 is a fragmentary section, on an enlarged scale, taken along line IV—IV of Fig. 1;

Fig. 5 is an enlarged side elevational view of the grappling tool, showing the parts thereof in various positions of adjustment; and Fig. 6 is an end elevation of the tool of Fig. 5.

The drawings illustrate fragmentarily at Fig. 1 a group of three storage battery cases which are individually designated 10 and are shown as standing in closely nested relation as upon a platform 12. Such mounting arrangement is typical, for example, in storage battery powered industrial vehicles; submarine vessels; and the like, and wherever it is desirable to effect space-saving economies. Referring to Figs. 1–4 of the drawing, the storage battery cases are illustrated to embody several features which are conventional in the storage battery art; such as being molded of any suitable hard rubber or plastic composition or the like, and such as being formed with foot pads as indicated at 14.

The battery cases of the drawing also are illustrated to include in each case a perimetral reinforcement in the form of an increased sectional thickness rim of molding material around the top edge of the case as indicated at 16; and a midriff spacer rim as indicated at 18. The rims 16—18 are designed to structurally reinforce the battery case walls and to buffer the latter against bumping stresses as during handling of the batteries and under normal service conditions. For example, loosely mounted batteries are constantly shifting as the mounting vehicle is jolted. However, the midriff rims 18 are designed to take the primary buffering loads and to keep the top rims 16 in spaced relation. For this purpose the rims 18 are formed of thickness dimensions greater than the thickness dimensions of the rims 16, so that whenever the midriff rims 18 are in contact with either an adjacently positioned battery or a mounting box, or the like, there will be a gap between the upper rim 16 and the adjacent battery box wall or the adjacent battery top rim, as is indicated at 20—20 in Fig. 1.

The lifting or grappling tool of the invention is illustrated in the drawing to comprise a lift bar 24 which carries at its opposite ends a pair of hanger straps 26—26; the straps being bored as indicated at 27 at their top ends so as to readily slipfit upon the bar 24 and to swing freely therefrom. Nuts 28—28 are threaded upon the opposite ends of the bar to hold the straps against disengagement therefrom and a lift link 30 is shown engaged at its lower end about the bar 24. A pair of spacer sleeves 32—32 are slipped upon the bar 24 at opposite sides of the lift link 30 so as to maintain the lift link centrally of the bar and approximately equidistant from the straps 26—26. The straps 26—26 carry integrally therewith at their lower ends lift shoes 34—34 which are in the form of straight-edge plates lapped against the inner faces of the straps 26 so as to provide corresponding lifting shoulders 36—36 (Fig. 5).

The shoes 34 are constructed and arranged so as to be suited to engage under the battery case rims 16 (Fig. 2) for battery case lifting purposes; and as shown in Fig. 2, the rims 16 are formed at their longitudinal central positions to be of flat bottom overhanging shelf form as indicated at 38, whereas the other portions of the rims 16 may be bevel-edged, as indicated at 39. Also, the battery case rim portions 16 are cut away as indicated at 40 to permit the tool strap pieces 26—26 to lie therein while the lifting edges 36 of the shoes 34 are in lifting position under the ledges 38 of the battery case.

It will be appreciated that in order to permit the lifting shoe portions of the grappling tool to move vertically past the battery case rims 16, the tool must be constructed and arranged to permit the lower ends of the straps 26—26 to spread, such as to the broken line positions thereof shown in Fig. 5. As explained hereinabove, the free-fitting attachments of the straps at their upper ends to the lifting bar 24 provides such freedom of movement of the straps, and an adjustable tie-rod 42 is inserted through suitably apertured portions of the lifting straps and is fitted with a thumb nut 44 for adjusting the spread of the lifting straps. A spacer sleeve 46 is slip-fitted over the bolt 42 intermediately of the straps so as to prevent undue contraction of the hanger unit in response to excessive tightening of the thumb nut 44 such as might pull the middle portions of the hangers too far inwardly relative to the side wall lines of the battery case such as would fulcrum the lower ends of the hangers outwardly to permit accidental disengagement of the lifting shoes from the battery case rim.

Thus, it will be understood that in order to engage the lifting tool upon the battery case the threaded nut 44 will be sufficiently loosened that the lifting shoe portions of the tool will spread sufficiently to permit the lower end of the tool to be slipped downwardly through the gaps 20—20 at opposite sides of the battery case to be lifted, until the shoe portions 34—34 come into position under the ledges 38—38 at opposite sides of the battery case. The thumb nut 44 is then tightened so that the hangers 26—26 clamp against the spacer tube 46; and the tool is thus adjusted so that when an upward lifting force applies through the link 30, such as by a lifting hook unit 50, the shoes 34—34 will engage under the ledges 38—38 of the battery case for lifting the latter out of its closely nested position. Reversely, a serviced battery may be lowered into the space which is illustrated to be presently occupied by the centrally positioned battery in Fig. 1; the lifting tool arms moving clear of the adjacent side wall structures by reason of their passage through the gaps 20—20 provided as explained hereinabove. Then, upon depositing of the serviced battery in mounting position, the wing nut 44 will be loosened so that the lifting shoes are free to shift out of engagement with the battery ledges 38, whereupon the tool may be withdrawn for other operations.

Thus, it will be understood that the novel battery case and lifting tool construction of the invention provides a very simple yet strong and rugged battery grappling arrangement which functions in improved manner to handle batteries in closely nested relation; and that although only one form of the invention has been illustrated and described herein it will be apparent to those skilled in the art that the invention is not so limited but that various changes may be made therein without departing from the spirit of the invention or the scope of the appended claims.

What is claimed is:

1. In combination, a battery lifting tool compirsing a cross bar and a pair of straps suspended from opposite ends of the cross bar and extending downwardly therefrom in parallel relation and each terminating in a lifting shoe portion, separate guide means spaced from said cross bar and inter-connecting said straps and adjustable to regulate the distance between said shoe portions; and a plurality of storage batteries adapted to be banked together in compact side-by-side relation, said batteries having generally rectangular shaped cases, said cases having top shoulder portions extending laterally therefrom and spacer abutments extending further laterally therefrom, the difference between the lateral extensions of said top shoulder portions and said spacer abutments being equal to at least half the thickness of said lifting shoe portion of one of said straps of said lifting tool, whereby said adjacent shoulder portions of said batteries are maintained in relatively spaced relation sufficient to pass said lifting shoe portions when said batteries are arranged in banked relation, and whereby said guide means may be loosely adjusted to permit the tool to be lowered so that the shoe portions move through the spaces between adjacent battery case shoulders into the spaces therebelow whereupon said guide means may be adjusted to force said shoes into engagement under said battery case shoulder portions so that said tool engages the battery for lifting purposes.

2. In combination, a lifting tool having a storage battery engaging portion, and a plurality of storage batteries banked together in side-by-side relation, said batteries having generally rectangular shaped cases, said cases having lift shoulder portions extending laterally therefrom and spacer abutments extending sufficiently further laterally therefrom as to maintain said lift shoulder portions in relatively spaced relation with spaces therebetween at least equal to the thickness of said battery engaging portion of said lifting tool when said batteries are arranged in contiguous banked relation.

3. A storage battery having a generally rectangular shaped case, said case having a top shoulder portion extending therearound and laterally therefrom, said top shoulder portion being provided with grappling tool receiving portions in the lateral extensions thereof, each of said tool receiving portions comprising a vertical slot extending across said top shoulder portion and a pair of tool shoe bearing surfaces extending generally horizontally along the lower border of said shoulder portion flanking said slot, and a spacer abutment located on said case in the midriff section thereof and extending laterally therefrom substantially beyond the position of extension of said top shoulder portion to provide battery grappling access past said top shoulder portion to said tool shoe bearing surfaces.

4. In combination, a battery lifting tool comprising a pair of straps extending downwardly in parallel relation and each terminating in a lifting shoe portion, said lifting shoe portion having a bearing portion extending generally horizontally flatwise to each side of the corresponding strap; and a plurality of storage batteries adapted to be banked together in compact side-by-side relation, said batteries having generally rectangular shaped cases, said cases having top shoulders extending laterally therefrom and spacer abutments extending further laterally therefrom to each side thereof, the difference between the lateral extensions of said top shoulders and said spacer abutments being equal to at least half the thickness of one of said lifting shoe portions of said lifting tool, said top shoulders being provided with grappling tool receiving portions in the lateral extensions thereof, each of said tool receiving portions comprising a vertical slot extending across the corresponding top shoulder to receive the corresponding tool strap and a tool shoe bearing surface extending generally horizontally along the lower border of said shoulder adjacent said slot to receive said bearing portion of said shoe portion, whereby the lifting shoes and straps of said tool may be inserted between said batteries through the spaces therebetween provided by said spacer abutments so that said lifting shoes may be engaged at said tool shoe bearing surfaces with said straps lying in said slots.

ALMOND H. SNYDER.

References Cited in the file of this patent

UNITED STATES PATENTS

| Number | Name | Date |
|---|---|---|
| 1,271,692 | Ford | July 9, 1918 |
| 1,355,050 | Kimball | Oct. 5, 1920 |
| 1,559,100 | Hottel | Oct. 27, 1925 |
| 1,612,582 | Holland | Dec. 28, 1926 |
| 1,725,905 | Galloway | Aug. 27, 1929 |
| 1,798,773 | Wydom | Mar. 31, 1931 |
| 1,806,956 | Smith | May 26, 1931 |
| 1,849,364 | Clark | Mar. 15, 1932 |
| 2,016,916 | Wentworth et al. | Oct. 8, 1935 |
| 2,085,724 | Black | July 6, 1937 |
| 2,199,229 | Smith | Apr. 30, 1940 |

FOREIGN PATENTS

| Number | Country | Date |
|---|---|---|
| 790,890 | France | Nov. 28, 1935 |